US012766055B2

(12) United States Patent
Ando et al.

(10) Patent No.: US 12,766,055 B2
(45) Date of Patent: Oct. 20, 2026

(54) MULTI-WHEELED WHEELCHAIR

(71) Applicant: FUJI WORLD Co., Ltd., Toyota (JP)

(72) Inventors: Yuichi Ando, Toyota (JP); Tetsuaki Kawata, Toyota (JP)

(73) Assignee: FUJI WORLD Co., Ltd., Toyota (JP)

( * ) Notice: Subject to any disclaimer, the term of this patent is extended or adjusted under 35 U.S.C. 154(b) by 191 days.

(21) Appl. No.: 18/928,240

(22) Filed: Oct. 28, 2024

(65) Prior Publication Data

US 2025/0049620 A1 Feb. 13, 2025

Related U.S. Application Data

(63) Continuation of application No. PCT/JP2023/047109, filed on Dec. 27, 2023.

(30) Foreign Application Priority Data

Jan. 20, 2023 (JP) ................................. 2023-007205

(51) Int. Cl.
*A61G 5/10* (2006.01)
*A61G 5/04* (2013.01)

(52) U.S. Cl.
CPC ............ *A61G 5/1078* (2016.11); *A61G 5/043* (2013.01)

(58) Field of Classification Search
CPC .............................. A61G 5/1078; A61G 5/043
USPC ....................................................... 280/250.1
See application file for complete search history.

(56) References Cited

U.S. PATENT DOCUMENTS 10,172,750 B1 * 1/2019 Dickie ................. B62K 11/007
2018/0028379 A1 * 2/2018 Bekoscke ................ A61G 5/06
2020/0155387 A1 * 5/2020 Bekoscke ................ A61G 5/10
2020/0206047 A1 * 7/2020 Goertzen ................ F16F 9/535
(Continued)

FOREIGN PATENT DOCUMENTS

CA 3205836 A1 * 1/2024 ............. A61G 5/122
CN 118845361 A * 10/2024 ........... A61G 5/1078
EP 3348248 A1 * 7/2018 ........... A61G 5/1078
(Continued)

OTHER PUBLICATIONS

International Search Report from International Application No. PCT/JP2023/047109 mailed Mar. 26, 2024.
(Continued)

*Primary Examiner* — James A Shriver, II
(74) *Attorney, Agent, or Firm* — Shih IP Law Group, PLLC.

(57) ABSTRACT

Provided is a multi-wheeled wheelchair that can be used both indoors and outdoors, is lightweight, low cost, and highly practical. A multi-wheeled wheelchair including a body frame, and a front wheel, a middle wheel, and a rear wheel provided on both left and right sides of the body frame includes a first rocker link having a first one end part that pivotally supports the front wheel, a first swinging part swingably connected to the body frame, and a first other end part, a second rocker link having a second one end part that pivotally supports the rear wheel, a second swinging part swingably connected to the body frame, and a second other end part, and a link coupling part connected to the first other end part and the second other end part. The link coupling part is provided with a middle wheel pivotally supporting part pivotally supporting the middle wheel.

4 Claims, 13 Drawing Sheets

(56) References Cited

U.S. PATENT DOCUMENTS

| | | | | |
|---|---|---|---|---|
| 2021/0259898 | A1* | 8/2021 | Bekoscke | A61G 5/043 |
| 2023/0106280 | A1 | 4/2023 | Suzuki | |

FOREIGN PATENT DOCUMENTS

| | | | | | |
|---|---|---|---|---|---|
| EP | 3354247 | A1 | * | 8/2018 | A61G 5/1089 |
| JP | 2014168971 | A | * | 9/2014 | |
| JP | 2018094998 | A | * | 6/2018 | |
| JP | 6755044 | B2 | * | 9/2020 | |
| JP | 2020151160 | A | * | 9/2020 | |
| JP | 7508165 | B1 | * | 7/2024 | A61G 5/1089 |
| KR | 20250001094 | A | * | 1/2025 | A61G 5/10 |
| WO | WO-2019195911 | A1 | * | 10/2019 | A61G 5/1078 |
| WO | WO-2021200945 | A1 | * | 10/2021 | A61G 5/1078 |

OTHER PUBLICATIONS

Yoji Kuroda, “Mobility System for Traverse Unstructured Terrain” Journal of the Robotics Society of Japan, 2003, vol. 21, No. 5, pp. 477-479.

Hayato Isoda et al, “Unmanned Exploration Robot Using Rocker-Bogie Mechanism,” Journal of the Japanese Society for Planetary Science, 2012, vol. 21, No. 2, pp. 148-154.

* cited by examiner

MULTI-WHEELED WHEELCHAIR

TECHNICAL FIELD

The present invention relates to a multi-wheeled wheelchair equipped with multiple wheels, and in particular to a multi-wheeled wheelchair that has been improved so as to accommodate a traveling path surface having an upward convex inclination switching path or a downward concave inclination switching path with respect to a traveling direction.

BACKGROUND ART

In recent years, four-wheeled and six-wheeled electric wheelchairs have been commercially available in various regions as a means of mobility without relying on caregivers. Electric wheelchairs can be divided into two types: a handle type, in which the front wheels are operated with a bar handle to change direction, and a joystick type, in which electric motors are arranged on the left and right and change direction by the difference in the number of revolutions of each motor. The joystick type is characterized by its high ability to turn in a small space, which is achieved by a spin turn rotating the left and right drive motors in opposite directions. Therefore, the volume of shipments of the joystick type units, which are highly convenient for use in hospitals and homes, is steadily increasing (Ministry of Economy, Trade and Industry, 2008). Joystick type electric wheelchairs currently available on the market can be divided into two types: a four-wheeled type with drive wheels on the front or rear wheels, and a six-wheeled type with drive wheels in the middle wheels. Although the six-wheeled system has the advantage of having a smaller space occupied during a spin turn than the four-wheeled system, as will be described later in detail, the six-wheeled vehicle has a problem that the middle wheels, which are the driving wheels, lose ground contact load and lose braking and driving force, and has a problem that the front wheels float resulting in pitching behavior, when a traveling path surface has an inclination switching, as will be also described later in detail. Therefore, it is said that the handle type and joystick type four-wheeled systems are suitable for outdoor use, while the joystick type six-wheeled system is suitable for indoor use. However, it is not realistic for one user to own multiple electric wheelchairs depending on the purposes. For this reason, there has been a demand for an electric wheelchair that combines the high ability to turn in a small space inherent to a six-wheeled type electric wheelchair with the good ground contact of a four-wheeled type electric wheelchair.

Non-Patent Literatures 1 and 2 disclose a wheeled mobile mechanism with a rocker-bogie link mechanism used in a Mars rover. Three wheels on one side are linked by a rocker link and a bogie link, and the left and right connecting rods connecting the left and right wheel trains are connected by a differential gear, so that all six wheels on the left and right are linked.

CITATION LIST

Non-Patent Literature

Non-patent literature 1: Yoji Kuroda, "Mobility System for Traverse Unstructured Terrain" Journal of the Robotics Society of Japan, 2003, Vol. 21, No. 5, pp. 477-479

Non-patent literature 2: Hayato Isoda et al, "Unmanned Exploration Robot Using Rocker-Bogie Mechanism," Journal of the Japanese Society for Planetary Science, 2012, Vol. 21, No. 2, pp. 148-154

SUMMARY OF INVENTION

Technical Problem

The characteristics of the rocker-bogie link mechanism adopted in Non-Patent Literatures 1 and 2 are also favorable for six-wheeled electric wheelchairs and can improve the ground contact of six-wheeled electric wheelchairs, but there are concerns about increased costs and weight due to the need to ensure the strength and rigidity of the components and the presence of a differential gear, etc. The rocker-bogie link, which is the precursor to the passive link mechanism, was developed for the purpose of traveling on rough roads on planets with a different gravity from Earth, so it is difficult to use this structure itself in a commercially available electric wheelchair in terms of cost-effectiveness.

The present invention has been made in view of the above-mentioned problems, and its purpose is to maintain the advantages of a six-wheeled electric wheelchair, such as space saving and high turning abilities, while eliminating the disadvantages regarding ground contact, and thus to provide a multi-wheeled wheelchair that can be used both indoors and outdoors, and is lightweight, low cost, and highly practical.

Solution to Problem

The invention for solving the above problems is a multi-wheeled wheelchair including a body frame, a front wheel, a middle wheel, and a rear wheel provided on both left and right sides of the body frame includes a first rocker link including a first one end part that pivotally supports an axle of the front wheel, a first swinging part swingably connected to the body frame, and a first other end part opposite to the first one end part across the first swinging part, a second rocker link including a second one end part that pivotally supports an axle of the rear wheel, a second swinging part swingably connected to the body frame, and a second other end part opposite to the second one end part across the second swinging part, and a link coupling part connected the first other end part and the second other end part. The link coupling part is provided with a middle wheel pivotally supporting part pivotally supporting an axle of the middle wheel, and is displaced in conjunction with swinging of the first rocker link and the second rocker link.

According to this configuration, the multi-wheeled wheelchair of the present invention has excellent effects inherent to a six-wheeled electric wheelchair, such as having a high ability to turn in a small space with a small minimum turning radius, a space-saving characteristic, and no uneven risk of front rollover and rear rollover. In addition to the above, the multi-wheeled wheelchair of the present invention can travel with maintaining the front wheels, middle wheels, and rear wheels in contact with the ground on a downward concave inclination switching path and an upward convex inclination switching path. Therefore, there is no loss of braking force or driving force even on a downward concave inclination switching path, and pitching behavior can be prevented even on an upward convex inclination switching path, and it is possible to safely climb up and down inclination switching paths of 13 degrees or more, which exceed the JIS standard. Moreover, it is lightweight and can be manufactured at low cost. These make it possible to provide a highly practical multi-wheeled wheelchair that can be used both indoors and outdoors.

Preferably, the link coupling part is provided with a supporting part and a support receiving part coupled to the supporting part in the multi-wheeled wheelchair.

According to this configuration, the link coupling part can be realized by a combination of simple configurations, which is advantageous in terms of cost and suitable for mass production.

Preferably, the support receiving part is provided with a pair of receiving faces, and the supporting part moves along the receiving faces in conjunction with rocking of the first rocker link and the second rocker link in the multi-wheeled wheelchair.

According to this configuration, the support receiving part is provide with receiving faces, and the supporting part moves along the receiving faces in conjunction with rocking of the first rocker link and the second rocker link, so that the front, middle, and rear wheels can smoothly follow unevenness of a traveling path due to the supporting part moving along the receiving faces. It is preferable that the receiving face includes a shape that extends linearly.

Preferably, the support receiving part is provided with displacement suppressing faces whose both ends are connected to both ends of the receiving faces, and the supporting part suppresses displacement of the first rocker link and the second rocker link by coming into contact with the displacement suppressing face in the multi-wheeled wheelchair.

According to this configuration, the displacement of the first rocker link and the second rocker link is suppressed by the supporting part coming into contact with the displacement suppressing face, so even if an unevenness of a traveling path becomes larger than expected, posture stability during traveling can be ensured.

Preferably, the receiving faces and the displacement suppressing faces cooperate to define a through hole in the multi-wheeled wheelchair.

According to this configuration, the receiving faces and the displacement suppressing faces cooperate to define a through hole, so that the support receiving part can have a simple structure. Examples of the shape of the through hole include a shape of long hole.

Preferably, the multi-wheeled wheelchair is characterized by including a driving unit that drives the middle wheel.

According to this configuration, since the driving unit is provided at the middle wheel where the wheel load can be set to be the largest, traveling stability can be ensured.

BRIEF DESCRIPTION OF DRAWINGS

FIG. 10 is a partial schematic diagram of a double rocker link mechanism according to the embodiment of the present invention, in which

DESCRIPTION OF EMBODIMENTS

Here, before explaining a multi-wheeled wheelchair of the present invention, the background circumstances that motivated the present invention will be explained in detail below. In recent years, four-wheeled and six-wheeled electric wheelchairs have been on the market as a means of moving without relying on a caregiver. Each wheelchair is provided with wheels equipped with drive motors on the left and right, and the drive motors allow the wheelchair to move straight, turn left/right, and rotate. In this case, it is important in a narrow traveling environment to enable a spin turn (super pivot turn) by rotating the left and right drive motors in opposite directions, that is, by reversely rotating them. Each of a four-wheeled electric wheelchair and a six-wheeled electric wheelchair has characteristics that are more advantageous than the other depending on the traveling environment, and each of them has different degrees of suitability for application depending on each characteristic.

Figure 1A:
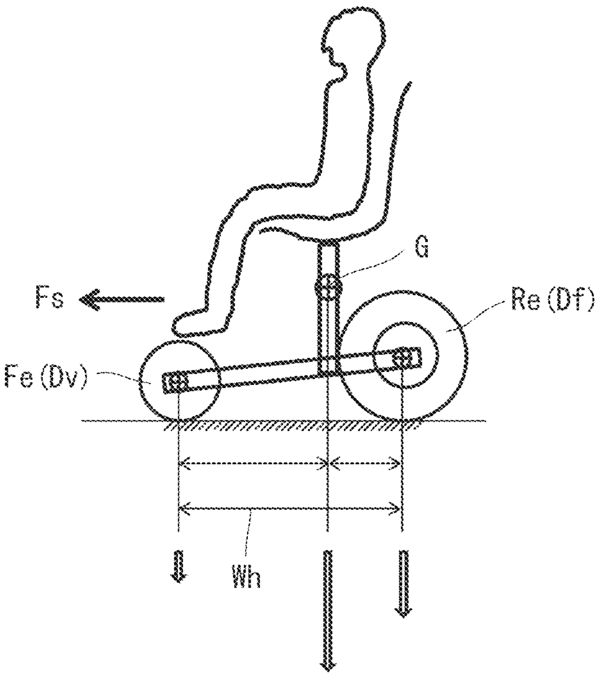
FIG. 1A is a schematic diagram schematically showing a side view of a four-wheeled electric wheelchair.

FIG. 1A schematically shows a side view of a rear-wheel drive four-wheeled wheelchair. Some four-wheeled wheelchairs have drive motors mounted on two front wheels Fe, but the illustrated four-wheeled wheelchair has drive motors mounted on two rear wheels Re. The driven wheels Dv of the four-wheeled wheelchair are caster wheels or wheels that roll in all directions (in any direction). The forward direction Fs is the traveling direction. Regardless of whether the wheelchair is front wheel drive or rear wheel drive, transmissibility of the braking force and driving force of the wheels relative to the traveling path (traction) is ensured by setting the center of gravity G of the entire vehicle and occupant near the drive wheels Df. Note that the reference sign Wh indicates the wheelbase length.

Figure 1B:
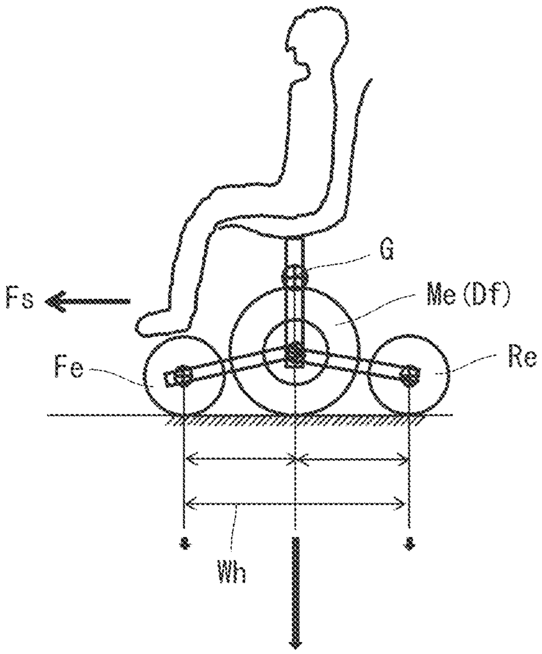
FIG. 1B is a schematic diagram schematically showing a side view of a six-wheeled electric wheelchair (comparative example)

FIG. 1B schematically shows a side view of a six-wheeled wheelchair. In the six-wheeled wheelchair, when viewed from the side of the vehicle, the front wheels Fe, middle wheels Me, and rear wheels Re are arranged so as to be lined up front to rear as shown in the figure. The middle wheels Me are provided with drive motors and serve as drive wheels. The front wheels Fe and the rear wheels Re are driven wheels, and caster wheels or wheels structured to roll in all directions (in any direction) are used. By setting the center of gravity G of the entire vehicle and occupant to the middle wheels Me serving as the driving wheels, transmissibility of the braking force and the driving force of the wheels relative to the traveling path (traction) is ensured.

Figure 2:
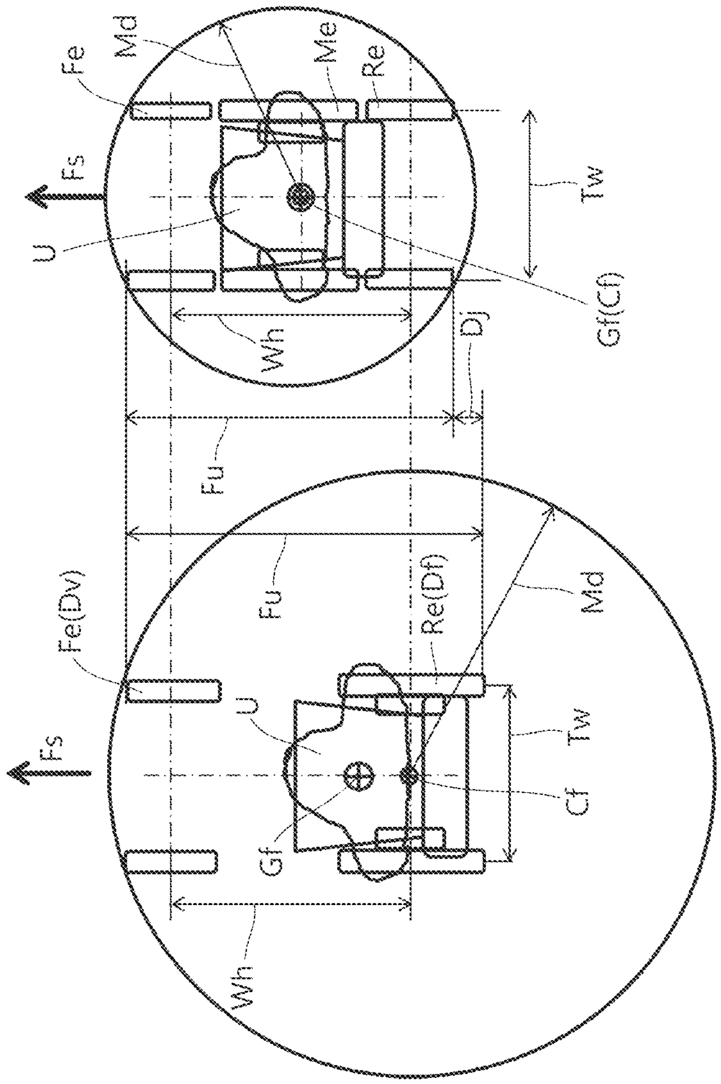
FIG. 2 is a schematic diagram showing a four-wheeled electric wheelchair and a six-wheeled electric wheelchair with the same wheelbase length and tread width (comparative example)

FIG. 2 shows the front-rear length Fu and minimum turning radius Md of spin turn for a four-wheeled electric wheelchair and a six-wheeled electric wheelchair with the same wheelbase length Wh and tread width Tw. The minimum turning radius Md of the six-wheeled electric wheelchair is smaller than that of the four-wheeled electric wheelchair. The four-wheeled electric wheelchair has a longer front-rear length (total length Fu) from the front end of the front wheel Fe to the rear end of the rear wheel Re than the six-wheeled electric wheelchair. For this reason, six-wheeled electric wheelchairs are more suitable for narrow environments such as general households than four-wheeled electric wheelchairs, which is why they are mainly used indoors. Note that the reference sign Dj indicates the total length difference between the four-wheeled electric wheelchair and the six-wheeled electric wheelchair, the reference sign Cf indicates the midpoint of the drive wheels, and Gf indicates the center of gravity of the entire vehicle and occupant.

Figure 3A:
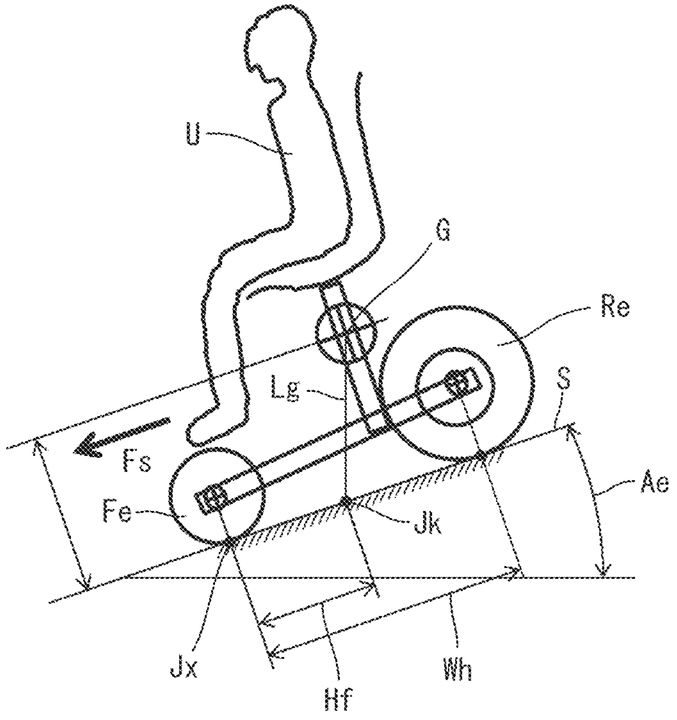
FIGS. 3A and 3B are schematic diagrams comparing the stability of electric wheelchairs on a downhill path, for a four-wheeled electric wheelchair (rear-wheel drive) and a six-wheeled electric wheelchair that have the same wheelbase length and height of the center of gravity (center of gravity of the entire wheelchair and occupant) (comparative example)
Figure 3B:
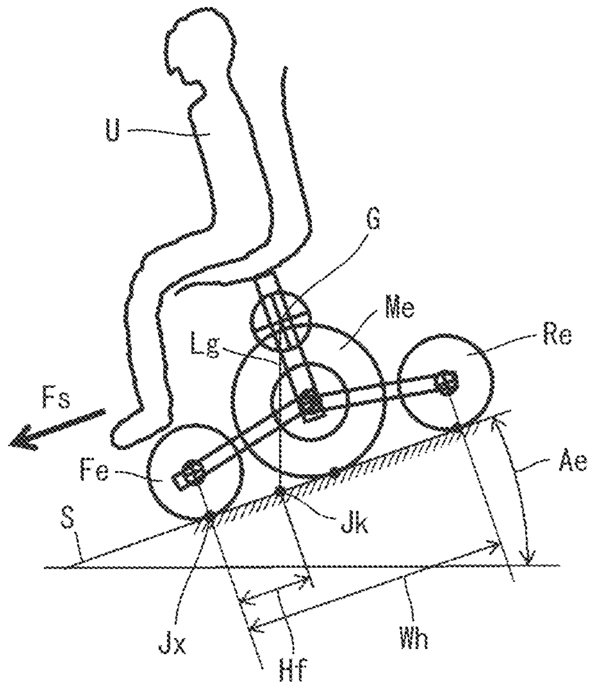

FIGS. 3A and 3B show a four-wheeled electric wheelchair (rear wheel drive) and a six-wheeled electric wheelchair, which have the same wheelbase length Wh and height Hk of the center of gravity G including the entire wheelchair and occupant. The stability of the each wheelchair traveling on a downhill path (downhill angle Ae) is compared. When the intersection Jk of the vertical line Lg from the center of gravity G of the occupant U and the wheelchair as a whole and the traveling path S deviates from the section of wheelbase length Wh, the wheelchair rollovers forward.

In a four-wheeled electric wheelchair, the center of gravity is located at the rear when traveling on level ground, so the front rollover limit of the four-wheeled electric wheelchair on a downhill path is high (see FIG. 3A). On the other hand, in the case of the six-wheeled electric wheelchair, the front rollover limit on the same downhill path as described above is disadvantageous compared to a four-wheeled electric wheelchair (see FIG. 3B). Note that the reference sign Hf indicates the distance of the section between the grounding point Jx of the front wheel Fe on the traveling path S and the intersection Jk as a non-protruding length.

Figure 4A:
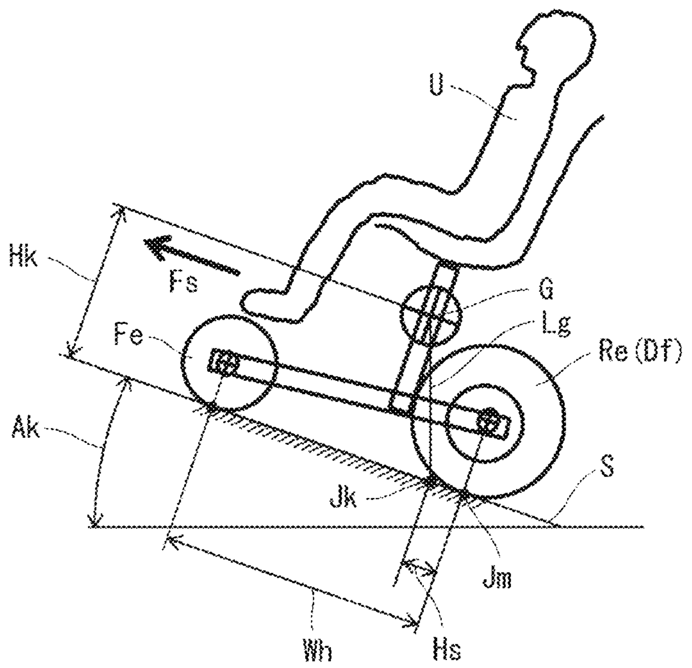
FIGS. 4A and 4B are schematic diagrams comparing the stability of electric wheelchairs on an uphill path, for a four-wheeled electric wheelchair (rear-wheel drive) and a six-wheeled electric wheelchair that have the same wheelbase length and height of the center of gravity (comparative example)
Figure 4B:
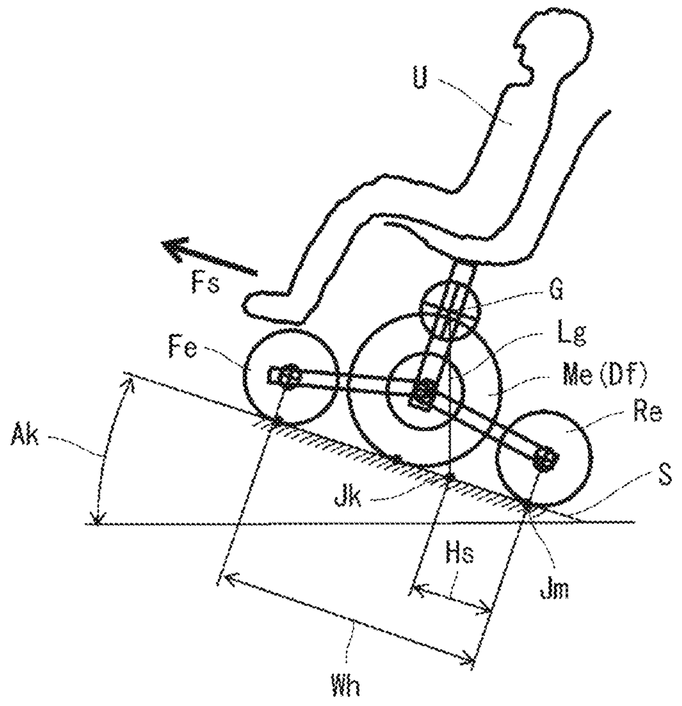

FIGS. 4A and 4B show how the center of gravity of a wheelchair moves in relation to a wheelbase length Wh, for a four-wheeled electric wheelchair and a six-wheeled electric wheelchair on an uphill path with the same inclination angle (uphill angle Ak). When considering the position of the intersection Jk of the two wheelchairs, it can be seen that the six-wheeled electric wheelchair has more margin in the backward rollover limit than the four-wheeled electric wheelchair. Therefore, in order to make the forward and backward rollover limits of a four-wheeled electric wheelchair the same as those of a six-wheeled electric wheelchair, the wheelbase length Wh of the four-wheeled electric wheelchair should be longer than that of a six-wheeled electric wheelchair. As a result, a four-wheeled electric wheelchair has a longer front-rear length, making it suitable for environments with a wide travel range, which is one of the reasons why a four-wheeled electric wheelchair is suitable for outdoor use. Note that the reference sign Hs indicates the distance of the section between the grounding point Jm of the rear wheel Re on the traveling path S and the intersection Jk as a non-protruding length.

Figure 5A:
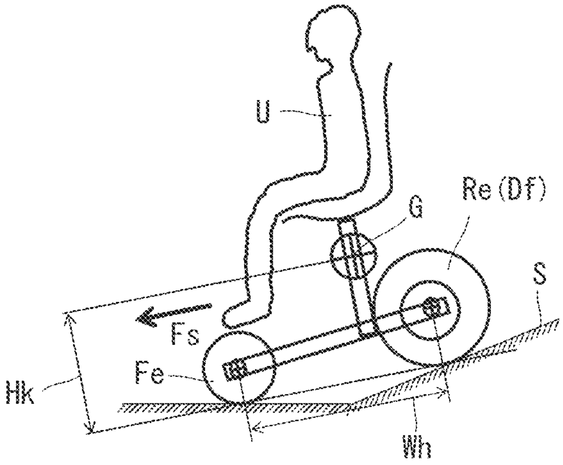
FIGS. 5A to 5D are schematic diagrams showing the grounding aspect of wheels in relation to a traveling path surface inclinations switching in a downward concave shape, for a four-wheeled electric wheelchair (rear-wheel drive) and a six-wheeled electric wheelchair that have the same wheelbase length and height of the center of gravity (comparative example)
Figure 5B:
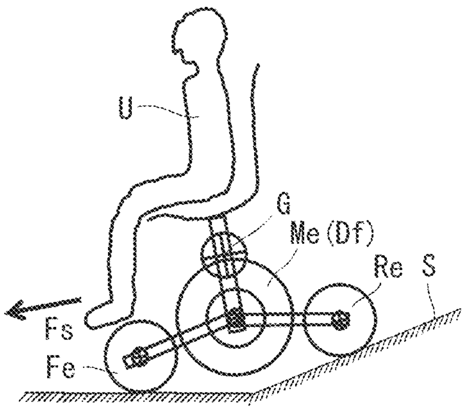
Figure 5C:
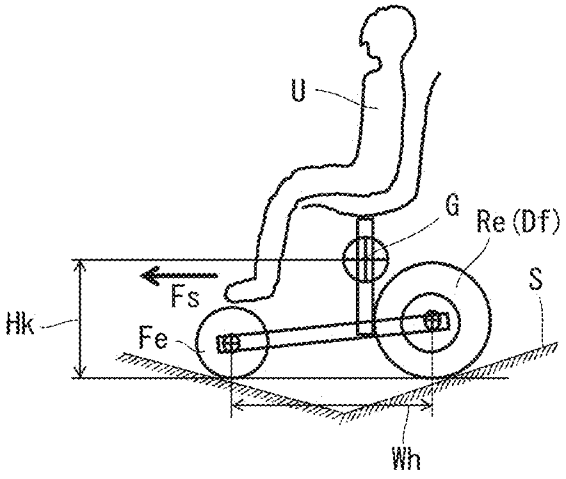
Figure 5D:
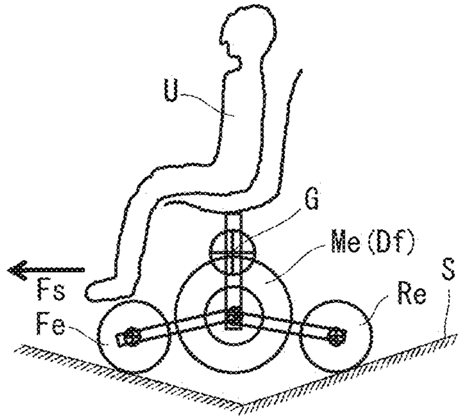

FIGS. 5A to 5D show grounding aspect of wheels in relation to traveling path surface inclinations switching in a downward concave shape, for a four-wheeled electric wheelchair (rear wheel drive) and a six-wheeled electric wheelchair having the same wheelbase length Wh and height Hk of the center of gravity G. In a four-wheeled electric wheelchair, all wheels can be in contact with the traveling path S, as shown in FIGS. 5A and 5C, whereas in a six-wheeled electric wheelchair, the middle wheels Me lose contact with the traveling path S, as shown in FIGS. 5B and 5D.

In the latter case, where the middle wheels Me lose contact with the ground, braking and driving forces will not be effective on the traveling path S. It can occur at outdoor sidewalks or step locations, and is one of the reasons why four-wheeled electric wheelchairs are more suitable for outdoor travel.

Figure 6A:
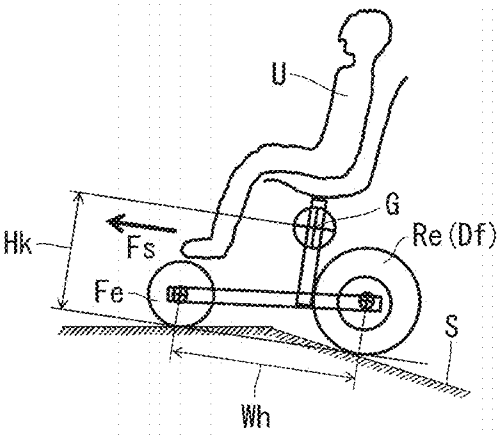
FIGS. 6A to 6F are schematic diagrams showing the grounding aspect of wheels in relation to a traveling path surface inclinations switching in a upward convex shape, for a four-wheeled electric wheelchair (rear-wheel drive) and a six-wheeled electric wheelchair that have the same wheelbase length and height of the center of gravity (comparative example)
Figure 6B:
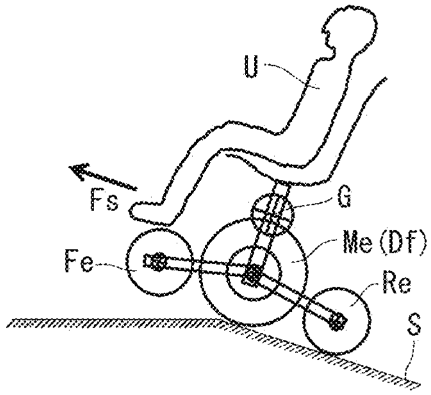
Figure 6C:
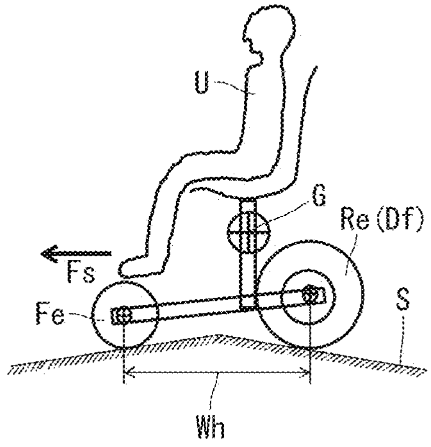
Figure 6D:
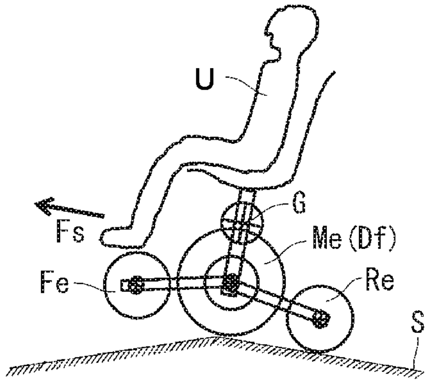

FIGS. 6A to 6F show grounding aspect of wheels in relation to traveling path surface inclinations switching in an upward convex shape, for a four-wheeled electric wheelchair (rear-wheel drive) and a six-wheeled electric wheelchair having the same wheelbase length Wh and height Hk of the center of gravity G of the wheelchair. In a four-wheeled electric wheelchair, all wheels can be in contact with the traveling path S, as shown in FIGS. 6A and 6C, whereas in a six-wheeled electric wheelchair, the front wheels Fe lose contact with the traveling path S, as shown in FIGS. 6B and 6D.

Figure 6E:
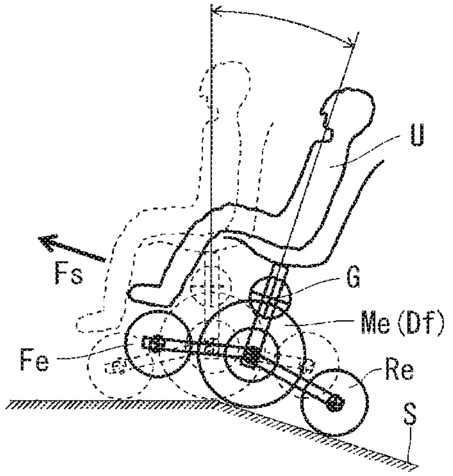
Figure 6F:
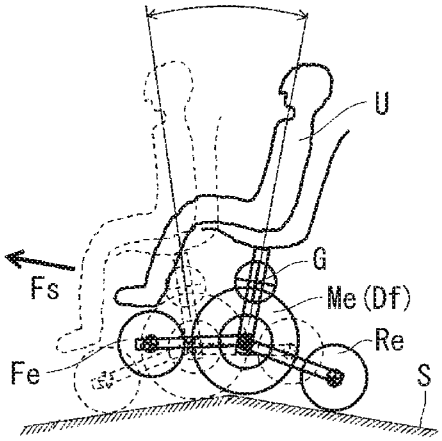

As shown in FIGS. 6E and 6F, the front wheels Fe, which have lost contact with the ground and are suspended in mid-air, exhibit a sudden pitching behavior (vertical shaking) in relation to the traveling path S when the middle wheels Me traveling forward Fs pass across the inclined traveling path surface. This pitching behavior does not affect the traveling performance, but it may cause anxiety to the seated occupant U. Traveling path surface inclinations that switch in an upward convex shape are often found outdoors, which is why four-wheeled electric wheelchairs are suitable for traveling outdoors.

The advantages and disadvantages of a four-wheeled electric wheelchair (rear-wheel drive) and a six-wheeled electric wheelchair mentioned above can be summarized as follows. If a six-wheeled electric wheelchair and a four-wheeled electric wheelchair have the same wheelbase length Wh, the six-wheeled electric wheelchair has the advantage over the four-wheeled electric wheelchair in terms of ensuring the minimum turning radius Md in narrow spaces and the length from the front end to the rear end of the wheelchair (total length).

In addition, for downhill and uphill traveling path, a six-wheeled electric wheelchair has no bias in its forward and backward rollover limits, so if a six-wheeled electric wheelchair and a four-wheeled electric wheelchair have the same wheelbase length Wh, the six-wheeled electric wheelchair will have larger forward and backward rollover limits than the four-wheeled electric wheelchair. On the other hand, the six-wheeled electric wheelchair has the disadvantage that the ground contact of the middle wheels Me is lost and the braking force and driving force become ineffective when the traveling path surface inclination switches in a downward concave shape.

Furthermore, a six-wheeled electric wheelchair has a problem that front wheels Fe or rear wheels Re lose contact with the ground when a path surface inclination switches in an upward convex shape, causing the wheelchair to exhibit a pitching behavior to cause a sudden shaking in the forward and backward directions, although it does not affect traveling performance. Therefore, there has been a demand for an emergence of a six-wheeled electric wheelchair that solves these problems and disadvantages while also has the inherent characteristics of a six-wheeled electric wheelchair, such as a high ability to turn in a small space with a small minimum turning radius Md, and a space-saving characteristic.

As such a six-wheeled electric wheelchair, one that adopts a rocker-bogie link mechanism, which is a conventional passive link mechanism, is being considered. Middle and rear wheels on one side are connected by a bogie link, and the bogie link and a front wheel is connected by a rocker link, and left-right connecting rods that connect the left and right wheel rows are connected by a differential gear, resulting in a six-wheel drive, six-wheel steering system. Although the characteristics of such a rocker-bogie link mechanism are also favorable for six-wheeled electric wheelchairs, there are concerns about the increase in cost and weight when adopting it in commercially available wheelchairs, due to the need to ensure the strength and rigidity of the components and the presence of the differential gear.

Having described in detail the background circumstances that motivated the present invention, the present invention will now be described. A multi-wheeled wheelchair of the present invention proposes and employs a double rocker link mechanism, which is a novel passive link mechanism. In the double rocker link mechanism, a front wheel and a middle wheel, and a middle wheel and a rear wheel are both linked by rocker links, and the two rocker links are coupled at the middle wheel position so that only vertical displacement can be transmitted. In the rocker-bogie link mechanism, one end attached to the rocker link attached to the body frame is connected to the center of the bogie link. In other words, the rocker link and the bogie link are connected in series to associate three wheels on one side. On the other hand, in the double rocker link mechanism of the multi-wheeled wheelchair of the present invention, two rocker links, each attached to the body frame, are coupled via a link coupling part to associate three wheels on one side.

A multi-wheeled wheelchair 10 according to an embodiment of the present invention will be described below.

Figure 7:
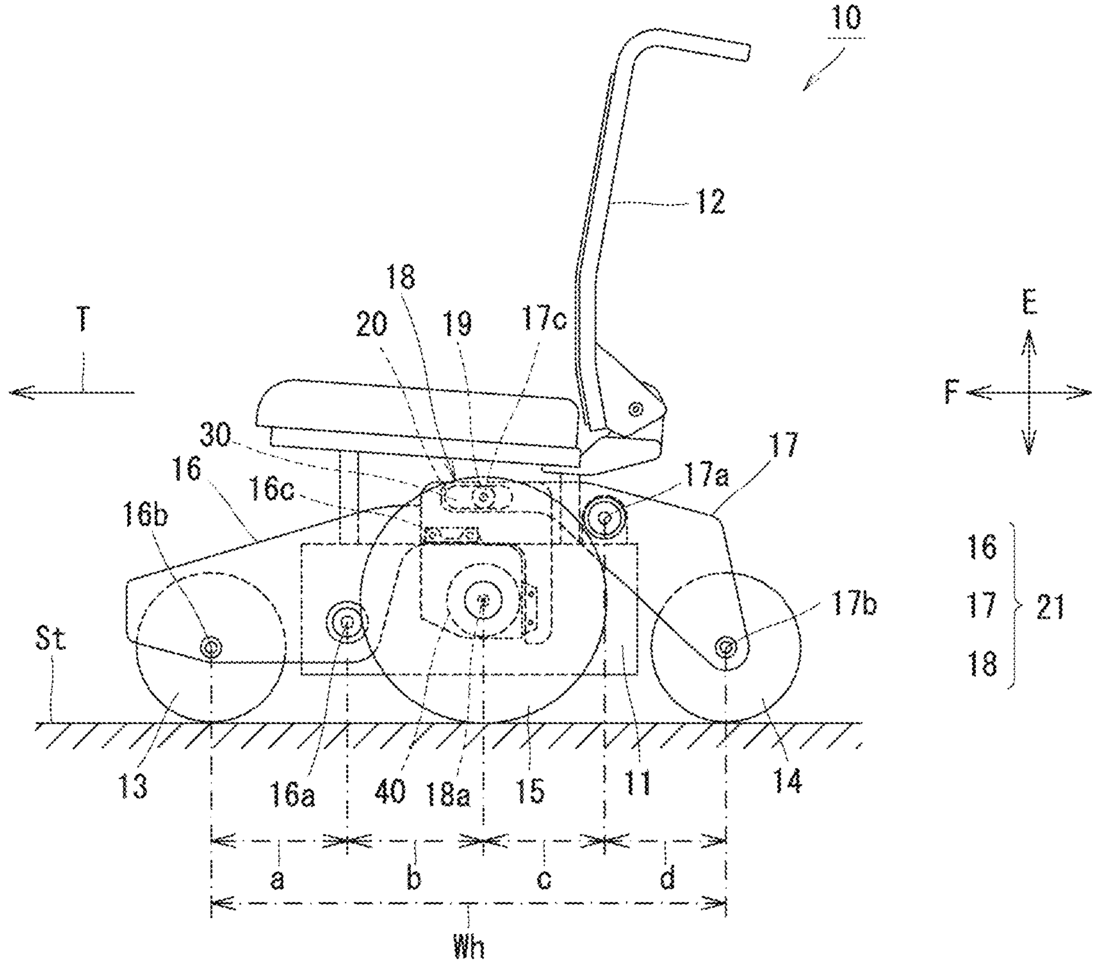
FIG. 7 is a schematic diagram showing a multi-wheeled wheelchair according to an embodiment of the present invention as a six-wheeled electric wheelchair.

An embodiment of the present invention will be described below with reference to FIGS. 7 to 10. As shown in FIG. 7, a multi-wheeled wheelchair 10 according to an embodiment of the present invention has a seat 12 attached to a body frame 11. On both the left and right sides of the body frame 11 in relation to the travel direction T, which is the forward direction of the seat 12, i.e. the forward direction of the multi-wheeled wheelchair 10, are provided a front wheel 13, a rear wheel 14, and a middle wheel 15 disposed between the front wheel 13 and the rear wheel 14. This makes the multi-wheeled wheelchair 10 a six-wheeled electric wheelchair. In the following illustrations, the front wheels 13, rear wheels 14, and middle wheels 15 are shown as schematic diagrams of only one side, not both the left and right sides, for convenience.

The middle wheels 15 are set to have a larger diameter than both the front wheels 13 and the rear wheels 14, and the middle wheels 15 serve as driving wheels and are driven to rotate along the traveling path St, causing the front wheels 13 and the rear wheels 14 to rotate along the traveling path St as driven wheels.

In the following description, the front wheels 13 and the rear wheels 14 are described as having the same diameter, but they may have different diameters. In addition, the middle wheels 15, which are driving wheels, are preferably larger in diameter than the front wheels 13 and the rear wheels 14, but this is not essential. Although not shown, electric motors 40 are started by operating a joystick provided as a control stick. By starting the electric motors 40 to drive the middle wheels 15 as driving wheels, the multi-wheeled wheelchair 10 can be steered to move forward, stop, turn left and right, and spin left and right, etc. The electric motors 40 are attached to each of the left and right middle wheels 15. By adjusting the driving force of the electric motors 40 attached to each of the left and right middle wheels 15, i.e., the rotation speed of each of the left and right middle wheels 15, the multi-wheeled wheelchair 10 can turn left and right, and can also spin turn.

The multi-wheeled wheelchair 10 has a pair of first links 16, which are first rocker links to link the front wheels 13, and a pair of second links 17, which are second rocker links to link the rear wheels 14, on each of right and left sides. The first links 16, the second links 17, and link coupling parts 18, which will be described later, form a double rocker link mechanism 21.

The first link 16 includes a first one end part **16*b*, a first other end part 16*c*, and a first swinging part 16*a*. The first link 16 is swingably attached to the body frame 11 by the first swinging part 16*a*. The first one end part 16*b* extends toward the axle of the front wheel 13 and is connected to the axle of the front wheel 13. The first other end part 16*c* forms a certain angle with the first one end part 16*b* and extends toward the axle of the rear wheel 14 and is connected to the link coupling part 18**.

The second link 17 includes a second one end part **17*b*, a second other end part 17*c*, and a second swinging part 17*a*. The second link 17 is swingably attached to the body frame 11 by the second swinging part 17*a*. The second one end part 17*b* extends toward the axle of the rear wheel 14 and is connected to the axle of the rear wheel 14. The second other end part 17*c* forms a certain angle with the second one end part 17*b* and extends toward the axle of the front wheel 13 and is connected to the link coupling part 18**.

The first other end part **16*c* and the second other end part 17*c* are coupled via a link coupling part 18 that relates their respective swinging displacements within a specific swing angle range. The link coupling part 18 has a middle wheel pivotally supporting part 18*a* that pivotally supports the axle of the middle wheel 15, and thus the axle of the middle wheel 15 is pivotally connected to the link coupling part 18. This allows the front wheels 13, the rear wheels 14, and the middle wheels 15** to be displaced in conjunction with each other and to swing in a state following the unevenness of the traveling path St.

The link coupling part 18 is composed of a roller pin 19 (supporting part) connected to the second other end part 17*c*, and a support receiving part 20 connected to the first other end part 16*c*.

Figure 10A:
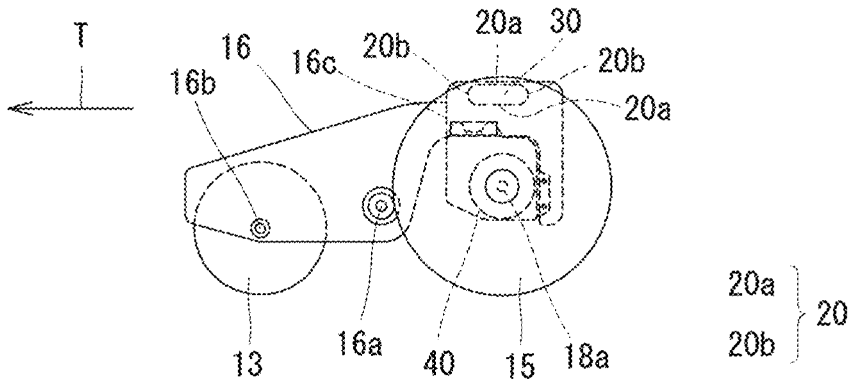
FIG. 10A shows a first rocker link and a link coupling part.
Figure 10B:
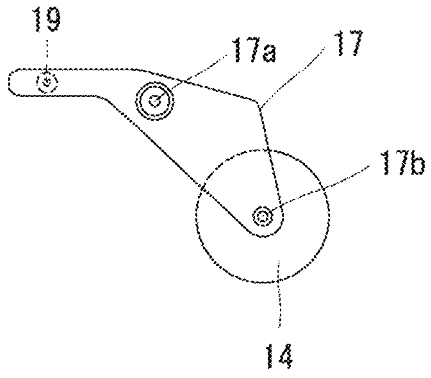
FIG. 10B shows a second rocker link.
Figure 10C:
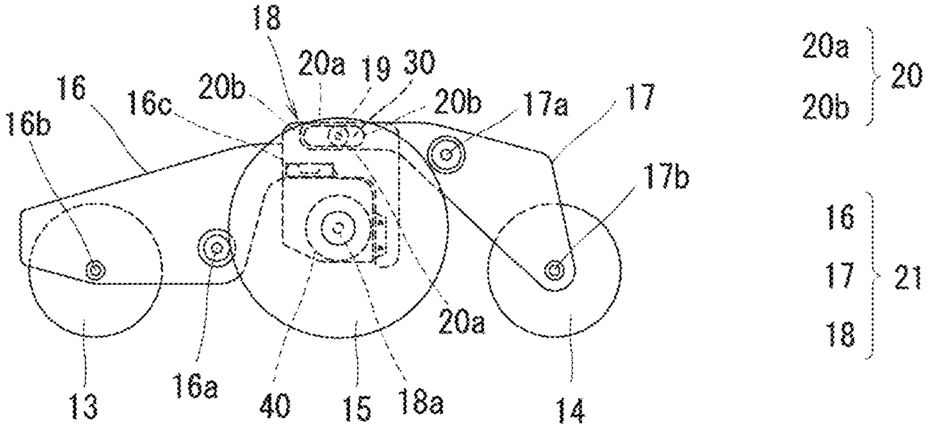
FIG. 10C shows a state in which the first rocker link mechanism and the second rocker link mechanism are coupled by a link coupling part.

As shown in FIG. 10, the support receiving part 20 has a pair of receiving faces 20*a*, 20*a*, and displacement suppression faces 20*b* connected to the ends of the pair of the receiving faces 20*a*, 20*a*. The receiving faces 20*a* and the displacement suppression faces 20*b* cooperate to define an elongated through hole 30. The receiving face 20*a* defines a face that extends linearly in the traveling direction T of the multi-wheeled wheelchair 10.

When all of the front wheels 13, rear wheels 14, and middle wheels 15 are in contact with the traveling path St, the roller pin 19 is in contact with one of the pair of receiving faces 20*a*, 20*a*, and is arranged with a small gap from the other receiving face 20*a*. When any of the front wheels 13, rear wheels 14, and middle wheels 15 pass over the unevenness of the traveling path St, the first link 16 and the second link 17 try to swing independently, but the roller pin 19 rolls or slides on the receiving face 20*a*, so that the swinging of the first link 16 and the second link 17 are related to each other. That is, due to the roller pin 19 rolling and moving on the receiving face 20*a* of the support receiving part 20, the displacement of both the first link 16 and the second link 17 while swinging displacement can be transmitted to each other. (See FIGS. 8 9.)

Figure 8:
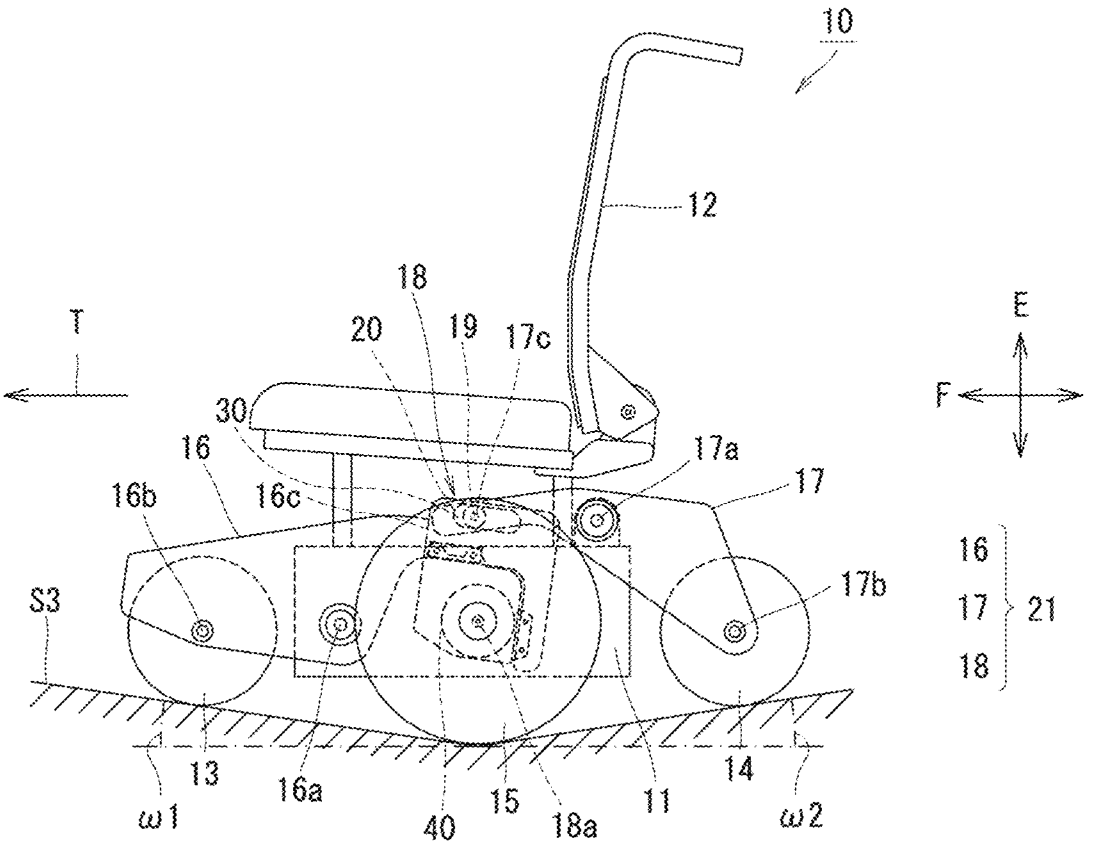
FIG. 8 is a schematic diagram showing a state in which the multi-wheeled wheelchair according to the embodiment of the present invention is traveling on a downward concave inclination switching path.
Figure 9:
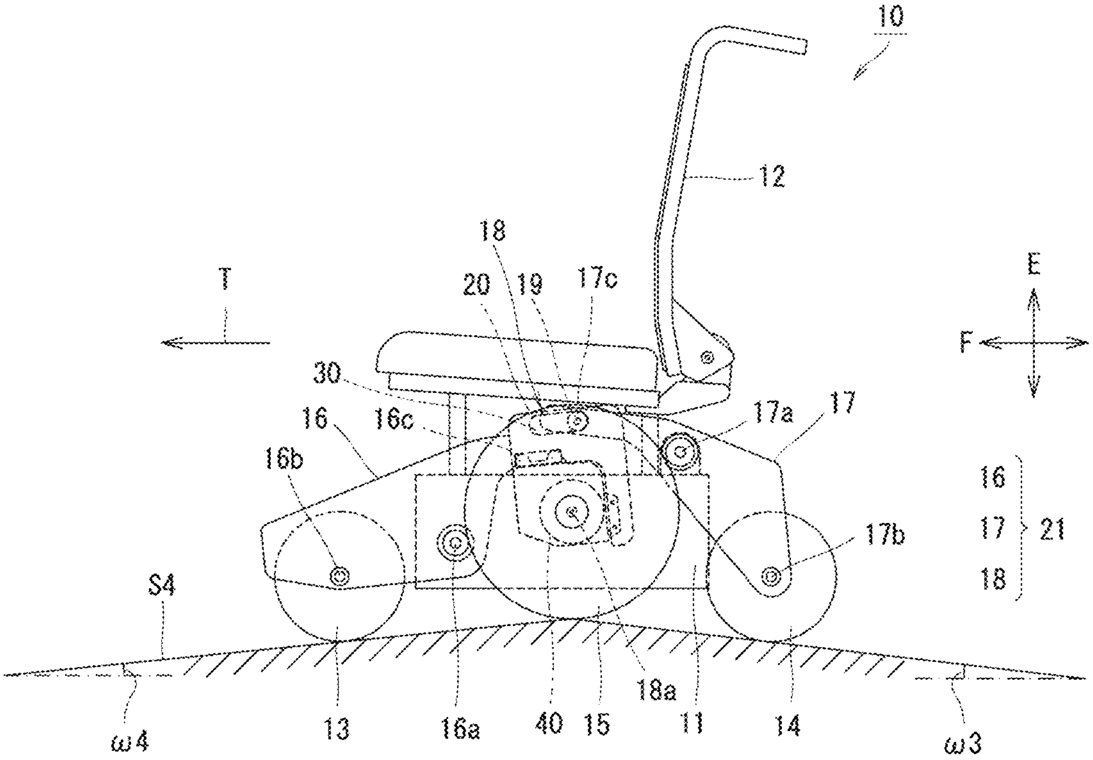
FIG. 9 is a schematic diagram showing a state in which the multi-wheeled wheelchair according to the embodiment of the present invention is traveling on an upward convex inclination switching path.

For example, when comparing the traveling state in FIG. 7 with the traveling states in FIGS. 8 and 9, the load ratio of the vertical load W borne by the front wheels 13, rear wheels 14, and middle wheels 15 are the same in each state. That is, the middle wheels 15 can exert a substantially constant driving force without being affected by the unevenness of the traveling path St.

The ground contact load of the middle wheels 15 required for traction may be determined as appropriate in consideration of traveling conditions. For example, if the total weight of the wheelchair and the occupant U is W, then when a:b:c:d=1:1:1:1 (see FIG. 7), the vertical loads on the first swinging parts 16*a* and the second swinging parts 17*a* are ½ W, and the vertical loads on the front wheels 13 and the rear wheels 14 are each ¼ W. The vertical load on the middle wheels 15 is ½ W, which is the sum of the vertical loads ¼ W from the first links 16 and the vertical load ¼ W from the second links 17. The ground contact load of the middle wheels 15 required for traction can be thus obtained.

In a situation where the traveling path St has an unevenness exceeding a predetermined unevenness, the roller pin 19 contacts the displacement suppression face 20*b*. As a result, swing displacements of the first link 16 and the second link 17 are suppressed. If the vehicle continues to move forward or backward under this situation, the middle wheels 15 will lose contact on the traveling path St and lose their driving force. That is, the displacement suppression faces 20*b* play a role in avoiding travels under severe conditions.

If there are continuous unevenness on the traveling path St, the first link 16 and the second link 17 will repeatedly swing in different directions. As a result, the roller pin 19 will be displaced in the direction in which the receiving faces 20*a* extend while contacting either of the pair of receiving faces 20*a*, 20*a*. This stabilizes the behavior of the first link 16 and the second link 17.

In this embodiment, the roller pin 19 is pivotally connected, as an example, but a pin structure that slides on the support receiving part 20 may be used. However, in this case, it is necessary to make the sliding resistance sufficiently small.

Effects of Embodiment

The double rocker link mechanism 21 is constructed by coupling the first link 16, which is the first rocker link, and the second link 17, which is the second rocker link, by the link coupling part 18, and thus the vertical movement of the front wheel 13 is linked to the vertical movement of the rear wheel 14 via the double rocker link mechanism 21.

Regarding the definition of upward and downward in the vertical movement of the front wheels 13 and the rear wheels 14, etc., the direction perpendicular to the horizontal direction F when the multi-wheeled wheelchair 10 is placed on a horizontal plane as shown in FIG. 7 is defined as a virtual vertical direction E of the multi-wheeled wheelchair 10 fixed to the multi-wheeled wheelchair 10, and based on the virtual vertical direction E, the upward movement relative to the body frame 11 is defined as an upward movement, and the downward movement relative to the body frame 11 is defined as a downward movement. According to this definition, for example, when he multi-wheeled wheelchair 10 is climbing a slope and the slope is switching from an inclined plane to a horizontal plane, the downward movement of the front wheels 13 and the downward movement of the rear wheels 14 are linked in conjunction with each other, at the point where the slope switches.

Therefore, on the downward concave inclination switching path S3 shown in FIG. 8, the front wheels 13 and the rear wheels 14 are rotationally displaced upward according to the inclination angles ω1 and ω2, so that the middle wheels 15, which are the driving wheels, are in contact with the ground also on the downward concave inclination switching path S3, and thus the braking force and the driving force can be advantageously applied on the inclined path. On the downward concave inclination switching path S3 shown in FIG. 8, the ground contact load of the middle wheels 15 will change somewhat from that in the horizontal arrangement as shown in FIG. 7. However, the change of the ground contact load is very small, and the ground contact load can be sufficient for braking and driving.

In addition, on the upward convex inclination switching path S4 shown in FIG. 9, the front wheels 13 and the rear wheels 14 are rotationally displaced downward according to the inclination angles ω3 and ω4, so that the front wheels 13 and the rear wheels 14 as well as the middle wheels 15 are all in contact with the ground, and thus it is possible to apply the braking force and the driving force on the inclined path, and it is also possible to prevent pitching behavior (vertical shaking) due to the loss of contact of the front wheels 13 on the ground even when the multi-wheeled wheelchair 10 travels in the traveling direction T on the upward convex inclination switching path S4. On the upward convex inclination switching path S4 shown in FIG. 9, the ground contact load of the middle wheels 15 will change somewhat from that in the horizontal arrangement as shown in FIG. 7. However, the change of the ground contact load is very small, and the ground contact load can be sufficient for braking and driving.

As described above, the multi-wheeled wheelchair 10 according to the embodiment of the present invention has excellent effects inherent to a six-wheeled electric wheelchair, such as having a high ability to turn in a small space with a small minimum turning radius Md, and a space-saving characteristic. In addition to the above, the multi-wheeled wheelchair 10 can travel with maintaining the front wheels 13, middle wheels 15, and rear wheels 14 in contact with the ground on the downward concave inclination switching path S3 and the upward convex inclination switching path S4.

Thereby, disadvantages of a six-wheeled electric wheelchair can be eliminated while maintaining its advantages, and it makes possible to apply a six-wheeled electric wheelchair not only indoors but also outdoors.

Figure 11:
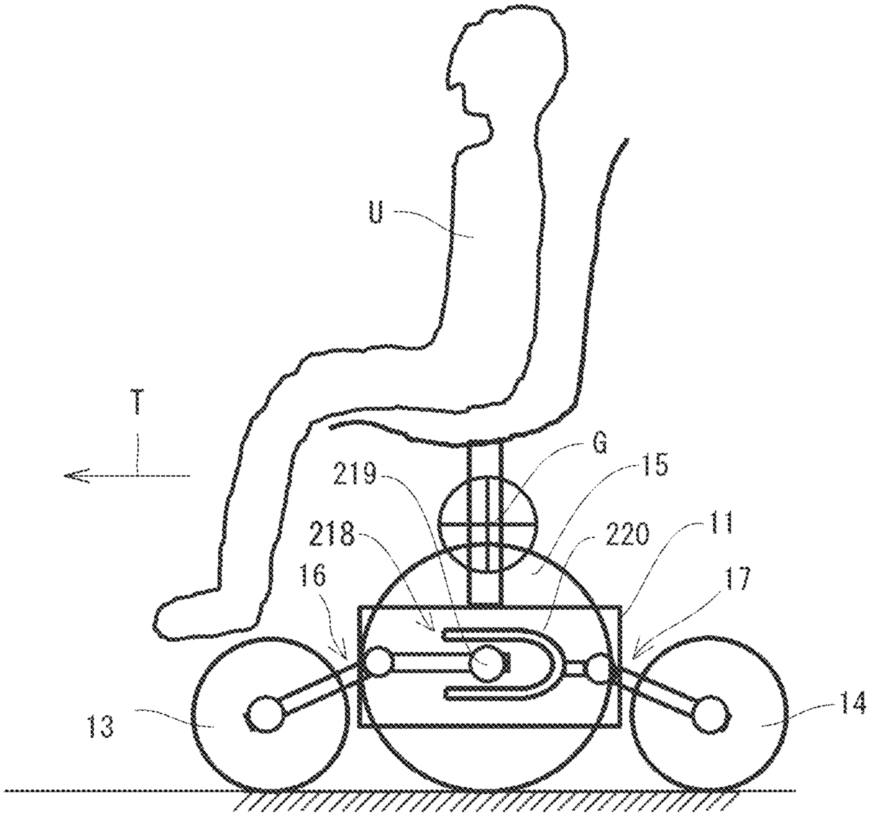
FIG. 11 is a modification of a multi-wheeled wheelchair.

In this embodiment, the link coupling part 18 is configured by the rotatable roller pin 19 and the support receiving part 20 in which the through hole 30 is defined, but the link coupling part 18 is not limited thereto. Other configurations can also be used if the same functionality is achieved. For example, as shown in FIG. 11, the link coupling part 218 may be configured by a U-shaped support receiving part 220 and a roller pin 219 that rolls or slides on the U-shaped support receiving part. In this case, the axle of the middle wheel 15 may be pivotally supported by a roller pin 219.

Although the multi-wheeled wheelchair 10 of this embodiment is a six-wheeled electric wheelchair, it is not limited to an electric wheelchair and may be a manual type. Further, not only a care recipient but also a healthy person can effectively use it as the occupant U.

INDUSTRIAL APPLICABILITY

The multi-wheeled wheelchair according to the present invention maintains advantages of a six-wheeled electric wheelchair while eliminating its disadvantages, making it possible to use a six-wheeled electric wheelchair not only indoors but also outdoors. Therefore, it is possible to provide a safe and highly practical wheelchair at a low cost, and it has great industrial applicability. It will also contribute to the promotion of manufacturing-related industries by stimulating demand from related parties for the convenience and usefulness of a six-wheeled electric wheelchair and activating its distribution in the market.

REFERENCE SIGNS LIST

10 . . . multi-wheeled wheelchair
11 . . . body frame
13 . . . front wheel
14 . . . rear wheel
15 . . . middle wheel
16 . . . first link (first rocker link)
17 . . . second link (second rocker link)
16*a* . . . first swinging part
17*a* . . . second swinging part
16*b* . . . first one end part
16*c* . . . first other end part
17*b* . . . second one end part
17*c* . . . second other end part
18 . . . link coupling part
19 . . . roller pin
20 . . . support receiving part
20*a* . . . receiving face
20*b* . . . displacement suppression face
30 . . . through hole

What is claimed is:

1. A multi-wheeled wheelchair including a body frame, a front wheel, a middle wheel, and a rear wheel provided on both left and right sides of the body frame, the multi-wheeled wheelchair comprising:

a first rocker link including a first one end part that pivotally supports an axle of the front wheel, a first swinging part swingably connected to the body frame, and a first other end part opposite to the first one end part across from the first swinging part;

a second rocker link including a second one end part that pivotally supports an axle of the rear wheel, a second swinging part swingably connected to the body frame, and a second other end part opposite to the second one end part across from the second swinging part; and a link coupling part including a middle wheel pivotally supporting part pivotally supporting the middle wheel, wherein the link coupling part is provided with a supporting part that is a roller pin connected to either one of the first other end part or the second other end part, and a support receiving part connected to the other one of the first other end part or the second other end part, the support receiving part is provided with a pair of receiving faces, and the supporting part moves along the receiving face when the link coupling part is displaced in conjunction with the swinging of the first rocker link and the second rocker link.

2. The multi-wheeled wheelchair according to claim 1, wherein the support receiving part is provided with displacement suppressing faces whose both ends are connected to both ends of the receiving faces, and the supporting part suppresses displacement of the first rocker link and the second rocker link by coming into contact with the displacement suppressing face.

3. The multi-wheeled wheelchair according to claim 2, wherein the receiving faces and the displacement suppressing faces cooperate to define a through hole.

4. The multi-wheeled wheelchair according to claim 1, further comprising a driving unit that drives the middle wheel.

* * * * *